United States Patent
Pan et al.

(12)

(10) Patent No.: US 10,901,074 B1
(45) Date of Patent: Jan. 26, 2021

(54) SYSTEMS AND METHODS FOR IMPROVING LIDAR PERFORMANCE

(71) Applicant: Hesai Technology Co., Ltd., Shanghai (CN)

(72) Inventors: Zhengqing Pan, Shanghai (CN); Shixiang Wu, Shanghai (CN); Shaoqing Xiang, Shanghai (CN); Kai Sun, Shanghai (CN)

(73) Assignee: HESAI TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 16/840,117

(22) Filed: Apr. 3, 2020

Related U.S. Application Data

(63) Continuation of application No. PCT/CN2020/078480, filed on Mar. 9, 2020.

(30) Foreign Application Priority Data

Feb. 17, 2020 (CN) .......................... 2020 1 0097778

(51) Int. Cl.
*G01S 7/4863* (2020.01)
*G01S 17/42* (2006.01)
(Continued)

(52) U.S. Cl.
CPC ............ *G01S 7/4863* (2013.01); *G01S 7/484* (2013.01); *G01S 7/4876* (2013.01); *G01S 17/42* (2013.01); *G01S 17/931* (2020.01); *G02F 1/353* (2013.01)

(58) Field of Classification Search
CPC ........ G01S 7/486; G01S 7/4863; G01S 7/487; G01S 7/4876; H04N 5/3658; H04N 5/378;
(Continued)

(56) References Cited

U.S. PATENT DOCUMENTS 8,976,445 B1 * 3/2015 Willner ................... G02F 1/353
359/326
10,348,051 B1 7/2019 Shah et al.
(Continued)

FOREIGN PATENT DOCUMENTS

CN  108387909 A  8/2018
CN  109073757 A  12/2018
(Continued)

OTHER PUBLICATIONS

Agishev et al. Lidar with SiPM: Some capabilities and limitations in real environment. Optics & Laser Technology 49 (2013) 86-90.
(Continued)

*Primary Examiner* — Eric L Bolda
(74) *Attorney, Agent, or Firm* — Wilson Sonsini Goodrich & Rosati

(57) ABSTRACT

Methods and systems for providing eye-safe compatible receiver for a light detection and ranging system. The light detection and ranging system comprises; an emitting unit comprising a light source configured to emit a sequence of light pulses of a first wavelength into a three-dimensional environment; and a receiving module comprising a detector for detecting light pulses of a second wavelength, in which the second wavelength is shorter than the first wavelength, the receiving module further comprising a wavelength converter coupled to the detector and configured to convert an echo signal of the emitted light pulses into the light pulses of the second wavelength.

25 Claims, 7 Drawing Sheets

(51) Int. Cl.
*G01S 7/484* (2006.01)
*G01S 7/487* (2006.01)
*G01S 17/931* (2020.01)
*G02F 1/35* (2006.01)

(58) Field of Classification Search
CPC .......... G02F 1/353; G02F 1/3558; G02F 1/37; G02F 1/3532
See application file for complete search history.

(56) References Cited

U.S. PATENT DOCUMENTS

| | | | | |
|---|---|---|---|---|
| 2006/0109542 | A1* | 5/2006 | Mizuuchi | G02F 1/3775 359/330 |
| 2007/0024840 | A1* | 2/2007 | Fetzer | G01S 7/4811 356/4.01 |
| 2010/0220384 | A1* | 9/2010 | Kimura | G02F 1/3544 359/328 |
| 2011/0284728 | A1* | 11/2011 | Burdge | G01S 7/483 250/216 |
| 2013/0089888 | A1* | 4/2013 | Woodward | G01N 21/17 435/34 |
| 2016/0209498 | A1* | 7/2016 | Kanter | G01S 17/10 |
| 2017/0153319 | A1* | 6/2017 | Villeneuve | H01S 3/08086 |
| 2018/0151758 | A1* | 5/2018 | Morimoto | G01S 7/4865 |
| 2018/0188371 | A1 | 7/2018 | Bao et al. | |
| 2018/0269646 | A1 | 9/2018 | Welford et al. | |
| 2020/0105958 | A1* | 4/2020 | Sasago | H01L 27/1461 |

FOREIGN PATENT DOCUMENTS

| | | |
|---|---|---|
| CN | 109188451 A | 1/2019 |
| CN | 110286388 A | 9/2019 |
| CN | 110506220 A | 11/2019 |
| WO | WO-2016149118 A1 | 9/2016 |

OTHER PUBLICATIONS

An Introduction to the Silicon Photomultiplier; Sensl Technologies; pp. 1-16 (2017).
Gnecchi et al. A 1×16 SiPM Array for Automotive 3D Imaging for LiDAR Systems. SensL Technologies Ltd., p. 1.
Periodically Poled Lithium Niobate (PPLN)—Tutorial; http://www.thorlabs.com; pp. 686-693.
PCT/CN2020/078480 Search Report & Written Opinion dated Nov. 20, 2020.

* cited by examiner

SYSTEMS AND METHODS FOR IMPROVING LIDAR PERFORMANCE

CROSS-REFERENCE

This application is a Continuation Application of International Application No. PCT/CN2020/078480, filed Mar. 9, 2020, which claims the benefit of Chinese Application No. 202010097778.4, filed on Feb. 17, 2020, each of which is entirely incorporated herein by reference.

BACKGROUND

Light detection and ranging (Lidar) technology can be used to obtain three-dimensional information of an environment by measuring distances to objects. A Lidar system may include at least a light source configured to emit a pulse of light and a detector configured to receive a returned pulse of the emitted light. The returned pulse of light or light beam may be referred to as an echo light beam. Based on the lapse time between the emission of the pulse of light and detection of returned pulse of light (i.e., time of flight), a distance can be obtained. The pulse of light can be generated by a laser emitter then focused through a lens or lens assembly. The returned pulse of light may be received by a detector located near the laser emitter. The returned pulse of light may be scattered light from the surface of an object.

For the light source, the 905 nm wavelength was chosen for early automotive lidars because pulsed diode laser emitters were readily available, relatively inexpensive, and could fit easily in spinning lidars mounted atop autonomous cars. As human eyes do absorb 905 nm laser light, Lidars need to be designed to comply with the eye-safety rules, such as limiting emitted laser energy at that wavelength, which effectively limits the range of many lidars to around 100 m. A detecting range of 100 meters may provide adequate reaction distance for cars moving at a speed of 30 MPH, but the detection range need to be substantially increased for cars which travel between 60-90 MPH on a freeway.

To increase the detecting range and comply with the eye-safety requirements, lasers having a wavelength of about 1550 nm are generally preferred for long distance detection and for eye-safety purposes. However, there are practical challenges in designing a Lidar that can detect the 1550 nm wavelength laser signals. Although an InGaAs avalanche photodetectors (APD) can be used for detecting the echo signals of a 1550 nm laser pulse, the InGaAs APD is very expensive and is unlikely to be used in any products. In addition, the InGaAs APD may not have enough detection sensitivity and quality for extremely weak echo signals which have been backscatter from a long distance such as 200 meters.

Silicon photomultiplier (SiPM) sensors have demonstrated superior performance with single photon sensitivity which is desired for long distance automotive Lidar where the intensity of the return laser pulse may be extremely weak. A SiPM sensor comprises high-sensitivity photodetectors such as single photon avalanche photodiodes (SPAD) which are characterized by a high internal gain of ~$10^6$ when biased above their breakdown voltage. A SiPM sensor features low-voltage operation, insensitivity to magnetic fields, mechanical robustness and excellent uniformity of response compared to other type of detectors for a Lidar system.

A SiPM sensor has higher sensitivity with a shorter wavelength (typically under 1000 nm) due to the quantum efficiency of silicon. For example, a SiPM sensor is capable of achieving 8.4% photon detection efficiency at 905 nm such that measurement signals with shorter wavelengths (under 1000 nm) are typically used in a SiPM-based Lidar system. However, when using a shorter wavelength signal light, the signal quality (signal-to-noise (SNR) ratio), or operation range (dynamic range) of the SiPM may be reduced due to the atmospheric background noise. For instance, a strong background radiation (e.g., an intense sky) may saturate and overload the photodetector thereby reducing the SNR.

Additionally, the current SiPM sensor usually requires a high-power pulsed diode laser operating within a spectrum range having a wavelength of 905 nm, 850 nm or 775 nm. However, a high-power pulsed diode laser that operates within this wavelength band may have a low laser beam quality due to its astigmatic nature. For example, the laser beam quality (e.g., $M^2$ is about 30) of a pulsed diode laser in the 905 nm wavelength band may not be as good as the laser beam quality (e.g., $M^2<1.2$) provided by a pulsed fiber laser in the 1550 nm wavelength band. Moreover, shorter wavelength, or high-power laser pulses may result in the lidar system not being eye-safe.

SUMMARY

A need exists for a Lidar system for three-dimensional measurement with improved light ranging accuracy and energy efficiency while providing eye-safe features. A further need exists for a receiver or detector of a Lidar system with improved detection range, signal-noise ratio (SNR) and compatible with eye-safe lasers. The provided Lidar system may address the above needs by employing a detecting module with improved sensitivity to eye-safe signal light and resistance to atmospheric background noise. Specifically, the provide Lidar system includes a converter that converts an echo signal of a longer wavelength to a shorter wavelength to permit the utilization of laser beams with a longer wavelength and to avoid the difficulties of detecting echo signals of a longer wavelength. Additionally, the emitting module may adopt a pulsed fiber laser to provide eye-safe light beams with better stability in contrast to a pulsed diode laser.

The receiving module of the Lidar system may comprise a detector with single-photon level sensitivity for detecting weak echo signals. The detector can convert light into an electrical signal. In some embodiments of the present disclosure, a detector may be an analog silicon photomultiplier (SiPM) detector.

In one aspect, methods and systems for providing an eye-safe compatible receiver for a light detection and ranging system. The light detection and ranging system comprises: an emitting unit comprising a light source configured to emit a sequence of light pulses of a first wavelength into a three-dimensional environment; and receiving module comprising a detector for detecting light pulses of a second wavelength, wherein the second wavelength is shorter than the first wavelength, the receiving module further comprising a wavelength converter coupled to the detector and configured to convert an echo signal of the emitted light pulses into the light pulses of the second wavelength.

In some embodiments, the first wavelength is in a range between 1400 nm and 2050 nm. In some embodiments, the first wavelength is outside the wavelength range detectable by the detector. In some embodiments, the light source comprises an eye-safe laser and a fiber amplifier. In some embodiments, the emitting module comprises a scanner to direct the sequence of light pulses to the three-dimensional environment to generate a point distribution pattern.

In some embodiments, the detector comprises a silicon photomultipliers (SiPM) sensor. In some embodiments, the second wavelength is shorter than 1000 nm. In some embodiments, the second wavelength is within a wavelength range detectable by the detector. In some embodiments, the receiving module comprises a first filter to remove unwanted light from the echo signal having the first wavelength and a second filter to remove unwanted light from the light pulses of the second wavelength.

In some embodiments, the emitting module comprises a splitter to split the sequence of light pulses for use in multiple channels. In some embodiments, the receiving module comprises multiple of the wavelength converters and multiple of the detectors for the multiple channels. In some cases, the light pulses received by the detector have the same second wavelength across the multiple channels. Alternatively, the light pulses received by the detector have different second wavelengths across the multiple channels.

In some embodiments, the first wavelength of the sequence of light pulses comprises multiple first wavelengths. In some cases, the wavelength converter receives a pump light comprising multiple wavelengths according to the multiple first wavelengths and the echo signals to generate light pulses of multiple second wavelengths.

In some embodiments, the sequence of light pulses with the multiple first wavelengths are used by multiple channels. In some cases, the second wavelength of the light pulses comprises multiple second wavelengths. In some instances, the light detection and ranging system further comprises one or more processors configured to calculate a distance based on a time of flight associated with the light pulses for the multiple channels.

In some embodiments, the wavelength converter comprises periodical poled lithium niobate (PPLN) crystal and a pump laser. In some cases, a pump light produced by the pump laser and the echo signal of the emitted light pulses are received at the PPLN and converted into the light pulses of the second wavelength. In some instances, the second wavelength is based on the wavelength of the pump light and the first wavelength.

In another related yet separate aspect, a method for a light detection and ranging system is provided. The method comprises: converting, by a wavelength converter, an echo signal of the emitted light pulses into light pulses of a second wavelength; and receiving, at the detector, the light pulses of the second wavelength, in which the second wavelength is shorter than the first wavelength.

In some embodiments, the first wavelength is in a range between 1400 nm and 2050 nm. In some embodiments, the first wavelength is outside the wavelength range detectable by the detector. In some embodiments, the sequence of light pulses generated by a light source comprising an eye-safe laser and a fiber amplifier. In some embodiments, the sequence of light pulses are directed to the three-dimensional environment by a scanner to generate a point distribution pattern.

In some embodiments, the detector comprises a silicon photomultipliers (SiPM) sensor. In some embodiments, the second wavelength is shorter than 1000 nm. In some embodiments, the second wavelength is within a wavelength range detectable by the detector.

In some embodiments, the method further comprises removing unwanted light from the echo signal having the first wavelength and removing unwanted light from the light pulses of the second wavelength using a second filter. In some embodiments, the method further comprises splitting the sequence of light pulses for use in multiple channels. In some cases, each of the multiple channels comprises an individual detector and an individual wavelength converter. In some cases, the light pulses received by the individual detector have the same second wavelength across the multiple channels. In some cases, the light pulses received by the individual have different second wavelength across the multiple channels.

In some embodiments, the first wavelength of the sequence of light pulses comprises multiple first wavelengths. In some cases, the method further comprises generating a pump light comprising multiple wavelengths according to the multiple first wavelengths. In some instances, the method further comprises receiving the pump light and the echo signals to generate light pulses of multiple second wavelengths. In some cases, the second wavelength of the light pulses comprises multiple second wavelengths. In some instances, the method further comprises calculating a distance based on a time of flight associated with the light pulses for the multiple channels.

Additional aspects and advantages of the present disclosure will become readily apparent to those skilled in this art from the following detailed description, wherein only exemplary embodiments of the present disclosure are shown and described, simply by way of illustration of the best mode contemplated for carrying out the present disclosure. As will be realized, the present disclosure may be capable of other and different embodiments, and its several details are capable of modifications in various obvious respects, all without departing from the disclosure. Accordingly, the drawings and description are to be regarded as illustrative in nature, and not as restrictive.

BRIEF DESCRIPTION OF THE DRAWINGS

A better understanding of the features and advantages of the present application will be obtained by reference to the following detailed description that sets forth illustrative embodiments, in which the principles of the invention are utilized, and the accompanying drawings of which.

DETAILED DESCRIPTION

Figure 1A:
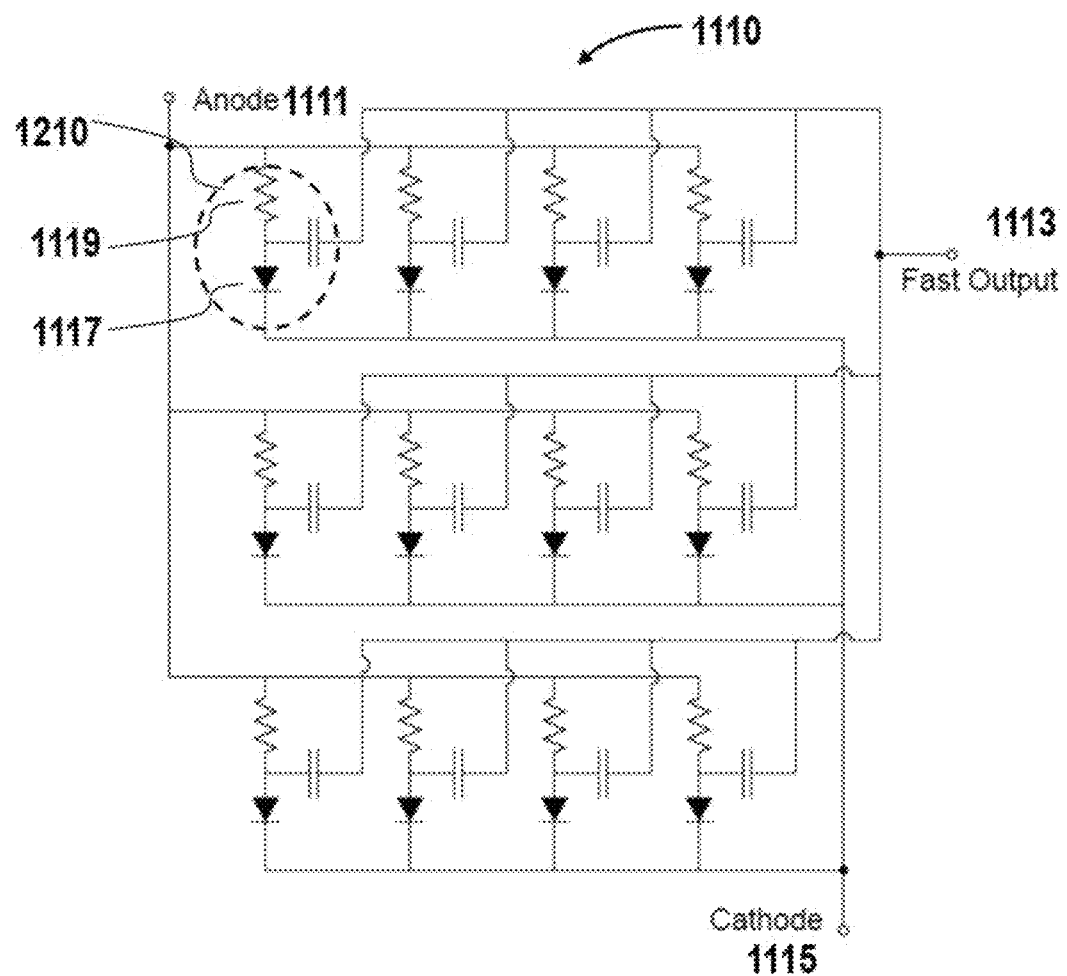
FIG. 1A shows an example of a Silicon photomultiplier (SiPM) sensor, in accordance with some embodiments of the present application.

While preferable embodiments of the invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention.

A Lidar system may be referred to as a laser ranging system, a laser radar system, a LIDAR system, or a laser/light detection and ranging (LADAR or ladar) system characterized by long detection distance, high resolution, and low interference by the environment. Lidar has been widely applied in the fields of intelligent robots, unmanned aerial vehicles, autonomous driving or self-driving. The working principle of Lidar is estimating a distance based on a round trip time (e.g., time of flight or delay time) of electromagnetic waves between a source and a target.

The provided Lidar system may utilize a multi-pulse sequence or sequence of light pulses to measure distance. As utilized herein, the term "measurement signals" generally refers to emitted light pulses or light pulses emitted from the emitting apparatus of the Lidar system to the environment unless context suggests otherwise. As utilized herein, the term "echo beams" may generally refer to return signals or returned light pulses which can be used interchangeably throughout the specification unless context suggests otherwise. A delay time may refer to the period of time between which the sequence of light pulses leaves the emitter and the reflected sequence of light pulses is received at the receiver. The delay time may then be used to compute a distance measurement. The delay time may also be referred to as time of flight which can be used interchangeably throughout the specification.

The emitting apparatus of the provided Lidar system may generate a sequence of light pulses emitted within short time durations such that the sequence of light pulses may be used to derive a distance measurement point. For example, Lidar can be used for three-dimensional (3D) imaging (e.g., 3D point cloud) or detecting obstacles. In such cases, a distance measurement associated with a sequence of light pulses can be considered a pixel, and a collection of pixels emitted and captured in succession (i.e., "point cloud") can be rendered as an image or analyzed for other reasons (e.g., detecting obstacles). A sequence of light pulses may be generated and emitted within a duration of, for example, no more than 10 ns, 20 ns, 30 ns, 40 ns, 50 ns, 60 ns, 70 ns, 80 ns, 90 ns, 100 ns, 200 ns, 300 ns, 400 ns, 500 ns, 600 ns, 700 ns, 800 ns, 900 ns, 1 μs, 2 μs, 3 μs, 4 μs, 5 μs. The time intervals among sequences may be constant or variable.

In some cases, light pulses emitted by an emitter may have multiple wavelengths. The echo beams with the corresponding multiple wavelengths may be split apart into the different wavelengths and received by different detectors (channels). In some cases, a multi-pulse sequence having a first wavelength may be emitted to a spot in a 3D environment and a successive multi-pulse sequence having a second wavelength may be emitted to a different spot in the 3D environment. Details about the multi-wavelength measurement signals are described later herein. Using different wavelengths for different channels may beneficially prevent cross-talking among channels or cross-talking between different Lidar systems.

In some cases, a multi-pulse sequence emitted by an emitter may be modulated according to a pre-determined temporal profile. The temporal profile may be specified by a firing pattern of the emitting module. In some cases, the temporal profile may be defined by a plurality of factors including, but not limited to, the number of pulses, time intervals, duration of pulses, amplitude of pulses, a ratio tween amplitudes of any two pulses (e.g., amplitude ratio), a ratio between durations of any two pulses in a sequence (e.g., duration ratio), duty cycle (e.g., ratio between duration of multi-pulse sequence and time interval between sequences), and various others derivatives. The pre-determined temporal profile may also beneficially prevent cross-talking among channels or cross-talking between different Lidar systems.

In some cases, a multi-pulse sequence may be emitted to a spot in a 3D environment and a successive multi-pulse sequence may be emitted to a different spot in the 3D environment. In some cases, all of the pixels (e.g., distance measurements) are obtained using multi-pulse sequences. In some cases, a selected subset of pixels is obtained using multi-pulse sequences and the remaining pixels may be obtained using un-encoded signals (e.g., single light pulse). For example, a selected subset of pixels in 3D imaging may be obtained using encoded signals such that each pixel may be generated based on a multi-pulse sequence and another subset of pixels may be obtained using un-encoded signals such that each pixel may be generated using a single light pulse. In some cases, measurement signals may be encoded at a coding frequency such that multi-pulse sequences may be interspersed with un-encoded signals at the coding frequency. For instance, a multi-pulse sequence may be followed by one or more un-encoded signals (e.g., single pulses) according to the coding frequency. The coding frequency may be specified by the firing pattern or emission pattern. In some cases, a selected portion of the returned multiple pulses in a sequence may be used for deriving a pixel value (e.g., intensity) and/or for calculating a distance.

A detector as described herein may be a photodetector or photosensitive detector that is suitable for detecting laser beams at a shorter wavelength below 1000 nm, such as 905 nm. The detector may preferably have the ability to detect extremely weak echo signals such as single or few photons in order to have a long detecting range. According to an embodiment, the detector may comprise one or more SiPM sensors each of which can convert light into an electrical signal. According to some embodiments of the present disclosure, a detector may be an analog silicon photomultiplier (SiPM) detector. A typical SiPM may have a high gain ($1 \times 10^6$) and photon detection efficiency (>50%) combined with the physical benefits of compactness, ruggedness and magnetic insensitivity. In addition, the SiPM detector may be low in power consumption by achieving its high gain with very low bias voltage (~30V) and the noise is almost entirely at the single photon level.

FIG. 1A shows an example of a Silicon Photomultiplier (SiPM) sensor, in accordance with some embodiments. A SiPM detector generally has better detection sensitivity, detection limit, and is relatively inexpensive. SiPM sensors have arrays of single photon avalanche photodiodes (SPAD) each of which has a high internal gain of $\sim 10^6$ when biased above their breakdown voltage in a Geiger-mode. The high internal gain of SiPM sensors overcomes the low noise limitation of the amplification stage in linear avalanche photodiode (APD) and PIN diode sensors and lead to a single photon sensitivity which is desired for long distance measurement where the intensity of the return laser pulse may be extremely weak.

As illustrated in FIG. 1A, a single photon causes a macro-current to be generated at the three output terminals: anode 1111, cathode 1115 and fast output 1113. The SiPM 1110 integrates a dense array of small, independent SPAD sensors 1117, each with its own quenching resistor 1119. Each independently operating unit of SPAD and quench resistor is referred to as a microcell 1210. When a microcell in the SiPM is activated in response to an absorbed photon, a Geiger avalanche is initiated causing a photocurrent to flow through the microcell. This results in a voltage drop across the quench resistor, which in turn reduces the bias across the diode to a value below the breakdown, thus quenching the photocurrent and preventing further Geiger-mode avalanches from occurring. Once the photocurrent has been quenched, the voltage across the diode recharges to the nominal bias value. During the avalanche process, all other microcells may remain fully charged and ready to detect photons. Because of the high degree of uniformity between the microcells, the SiPM is capable of discriminating the precise number of photons detected as distinct, discrete levels at the output node.

A typical SiPM detector may have good responsivity towards shorter wavelength such as 400-1000 nm that may not be compatible with longer wavelength signal light (e.g., 1550 nm). As described elsewhere herein, measurement signals with longer wavelength are desired in Lidar system. The laser beam quality at the short wavelength may be degraded compared to the long operating wavelength. On the other hand, in the 1550 nm wavelength band, pulsed fiber lasers or fiber coupled lasers can have good beam quality (e.g., $M^2<1.2$) and the energy density of atmospheric background noise is lower compared to a shorter wavelength bandwidth. Moreover, as laser light is both generated and delivered by an inherently flexible medium in a fiber coupled laser device, the assembly process of which requires minimum or no alignment (compared to solid state or gas lasers device), thereby further enhancing the reliability and robustness of the Lidar system. The provided receiving module of the Lidar system in the present application may be improved by employing a wavelengths conversion module that is capable of converting laser beams from one wavelength to a different wavelength, thus beneficially allowing for a SiPM-based receiving module with good detection performance at a longer wavelength.

In some embodiments, the provided Lidar system may have an emitted laser beams of a long wavelength such as 1550 nm wavelength band allowing for an eye-safe Lidar system. As described above, operating at a long wavelength may result in poor performance (e.g., reduced SNR) of a conventional SiPM detector. The receiving module or receiving unit of the present Lidar system may have improved capability of detecting eye-safe laser pulses by employing a wavelength converter which converts the returned laser pulses (e.g., 1550 nm) into a light signal having a wavelength falls within the operating wavelength band (e.g., 700-940 nm) of a SiPM detector thereby improving the overall performance of the Lidar system.

The provided receiving module can be implemented in various types of Lidar systems. For example, the Lidar system may comprise an emitting apparatus including a scanner to scan the laser pulses across a space in the environment. In another example, the provided methods and systems may be implemented in a solid state Lidar system. In a further example, the provided receiving module may be implemented in a spinning Lidar system in which lasers and/or detectors are mounted on a spinning head or other electromechanically-intensive traditional Lidar system.

Figure 1B:
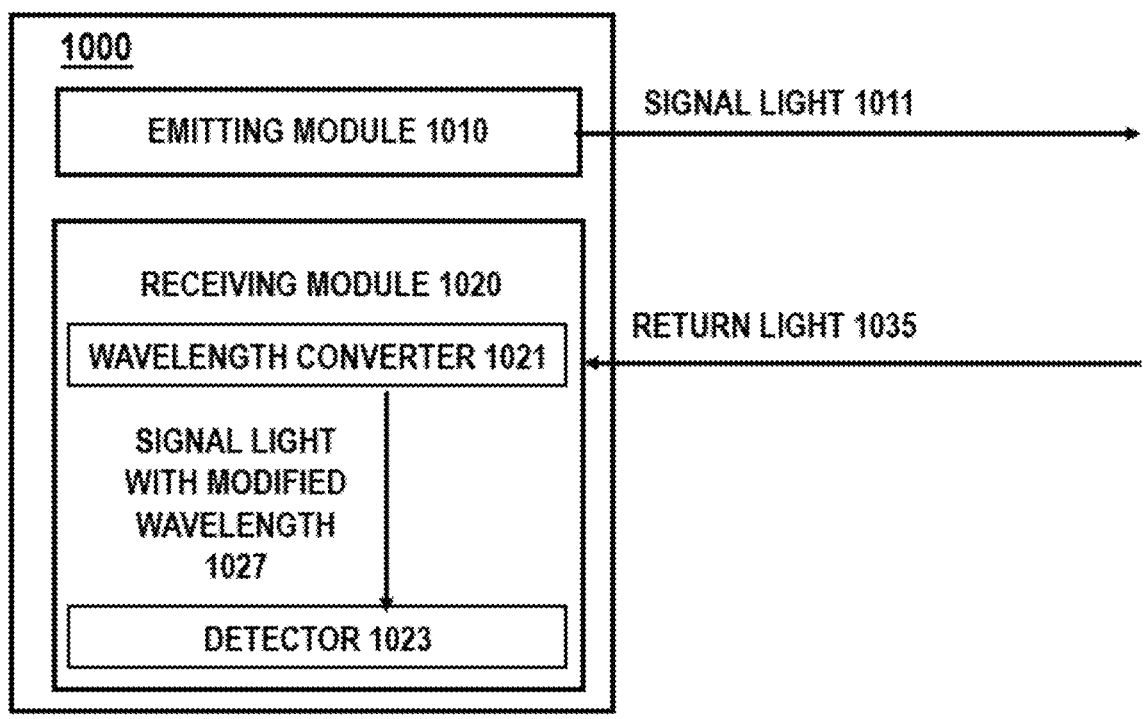
FIG. 1B schematically illustrates an example of a Lidar system, in accordance with some embodiments of the present application.

FIG. 1B schematically shows an example of a Lidar system 1000, in accordance with some embodiments of the present application. In some embodiments, a Lidar system 1000 may comprise an emitting module 1010, a receiving module 1020, and a control unit (not shown). The receiving module 1020 may comprise a wavelength converter 1021 and a detector 1023. The detector 1023 may comprise one or more SiPM detectors configured to receive light signals 1027 with frequency/wavelength modified by the wavelength converter to fully utilize the high-sensitivity and measurement accuracy of the SiPM detector. As shown in FIG. 1A, a SiPM detector may be a 1D or 2D detector array.

In some embodiments, the emitting module 1010 may comprise at least one light source configured to generate laser beams or pulses of light. The light source may comprise an eye-safe laser. In some embodiments, the light source may comprise a fiber coupled laser operating in the 1550 nm wavelength band allowing for an improved SNR. As described above, in the 1550 nm wavelength band, pulsed fiber lasers or fiber coupled lasers have good beam quality (e.g., $M^2<1.2$), stabilized wavelength, and the energy density of atmospheric background noise is lower compared to a shorter wavelength bandwidth, such that the atmospheric background noise can be efficiently removed by using a narrow bandpass filter at the receiving module, thereby improving the SNR.

The laser beams or pulses of light 1011 generated by the emitting module 1010 may be emitted to the environment. The wavelength of the laser beam 1011 may be in any suitable range depending on the specific application. In some embodiments, the laser beams 1011 scanning across a space in the environment may be eye-safe lasers and the light source may include eye-safe lasers. An eye-safe laser may refer to a laser with an emission wavelength, average power, peak power, peak intensity, pulse energy, beam size, beam divergence, or exposure time such that emitted light from the laser presents little or no possibility of causing damage to a person's eyes. As an example, the light source may be classified as a Class 1 laser product (as specified by the 60825-1 standard of the International Electrotechnical Commission (IEC)) or a Class I laser product (as specified by Title 21, Section 1040.10 of the United States Code of Federal Regulations (CFR)) that is safe under all conditions of normal use. In some embodiments, the light source may include an eye-safe laser (e.g., a Class 1 or a Class I laser) configured to operate at any suitable wavelength between approximately 1400 nm and approximately 2100 nm. In some cases, the light source may include an eye-safe laser with an operating wavelength between approximately 1400 nm and approximately 1600 nm. In some cases, a light source may include an eye-safe laser with an operating wavelength between approximately 1530 nm and approximately 1570 nm.

In some cases, the light source may include a fiber-laser module. In an example, the fiber-laser module may include a current-modulated laser diode that generates a peak wavelength of approximately 1550 nm. The fiber-laser module also includes a single-stage or a multi-stage erbium-doped fiber amplifier (EDFA) disposed right after the laser diode. Other components may be further included in the laser module to condition the emitted laser.

The emitting module 1010 can comprise other optical elements (e.g., reflectors, lens, collimator) such that the signal light generated by the light source may be directed to the one or more optical components and/or pass through a lens assembly (e.g., collimation lens, collimation lens assembly) for collimating or focusing light beams. The Lidar system 1000 can include any suitable optical components such as one or more lenses, mirrors, filters (e.g., bandpass or interference filters), beam splitters, polarizers, polarizing beam splitters, wave plates (e.g., half-wave or quarter-wave plates), diffractive elements, or holographic elements, telescope, to expand, focus, or collimate the output beam 1011 to a desired beam diameter or divergence. In some cases, the emitting module may comprise a scanner and the light pulses may be steered into different directions into the environment by the scanner.

In some embodiments, the receiving module 1020 may comprise a wavelength converter 1021 and a detector 1023. The detector 1023 may comprise one or more SiPM detectors. The detector 1023 may receive light signals 1027 with frequency/wavelength modified by the wavelength converter to fully utilize the high-sensitivity and measurement accuracy of the SiPM detector. In some embodiments, the wavelength converter 1021 may comprise a frequency/wavelength converter (e.g., periodical poled lithium niobate (PPLN) crystal) to convert the returned signal light 1035 to a light signal with a shorter wavelength to which the SiPM detector has a high responsivity. For example, the returned signal light may comprise echo beams at a first wavelength (e.g., 1550 nm) that is outside a wavelength range (e.g., 600 nm-1000 nm) detectable by the SiPM detector and the modified wavelength (e.g., 750 nm) may be within the detectable wavelength range. Details about the receiving module and the wavelength converter are described later in the present application.

The Lidar system 1000 may be an eye-safe system. The Lidar system may operate at one or more wavelengths between approximately 1400 nm and approximately 1600 nm. For instance, the signal light 1011 emitted to the environment may have wavelength in a range of about 1500 nm to 1560 nm. The signal light may be single-wavelength. Alternatively or in addition to, the signal light may be multi-wavelength or comprise light pulses at multiple different wavelengths. The multiple wavelengths of the signal light may be above 1000 nm (e.g., 1549.32 nm, 1550.12 nm, 1550.92 nm) and utilized by different channels of the Lidar system 1000 to provide additional advantages such as reducing cross-talk among different channels or different Lidar systems.

In some embodiments, the signal light 1011 may comprise light pulses having a pulse repetition frequency of less than or equal to 100 MHz (e.g., approximately 500 kHz, 640 kHz, 750 kHz, 1 MHz, 2 MHz, 4 MHz, 5 MHz, 10 MHz, 20 MHz, 50 MHz, or 100 MHz), a pulse duration of less than or equal to 100 nanoseconds (e.g., approximately 200 ps, 400 ps, 500 ps, 800 ps, 1 ns, 2 ns, 4 ns, 8 ns, 10 ns, 20 ns, 50 ns, or 100 ns), a duty cycle of less than or equal to 10% (e.g., approximately 0.01%, 0.02%, 0.05%, 0.1%, 0.2%, 0.5%, 1%, 2%, 5%, or 10%), or an operating wavelength of between 1400 nm and 2050 nm. As an example, the light pulses may have a pulse repetition frequency of 500-750 kHz, a pulse duration of less than or equal to 2 ns, and a duty cycle of less than or equal to 0.1%. As another example, the light pulses may have a pulse repetition frequency of approximately 640 kHz and a pulse duration of approximately 1 ns (which corresponds to a duty cycle of approximately 0.064%). As another example, the laser pulses may have a pulse repetition frequency of approximately 750 kHz and a pulse duration of approximately 20 ns (which corresponds to a duty cycle of approximately 1.5%). A duty cycle may be determined from the ratio of pulse duration to pulse period or from the product of pulse duration and pulse repetition frequency.

The return light signal 1035 may have a wavelength above 1000 nm. The return light signal 1035 comprises at least the echo beams of the signal light 1011. The return light signal 1035 may be converted into a shorter wavelength light signal by the wavelength converter of the receiving module before received by the SiPM detector. The return light signal 1035 may also comprise unwanted signals such as background noise scattered from the environment. The return light signal 1035 may pass through one or more optical components (e.g., collimation lens, collimation lens assembly, bandpass filters) so that the unwanted signals may be removed and the echo pulses at a modified frequency can be directed, focused onto an active region of a detector 1023. The receiving module 1020 may include any suitable optical components such as, one or more mirrors (e.g., flat mirror, concave mirror, convex mirror, parabolic mirror) or lens/lens assembly to direct the echo light beams to the detector 1023.

In some embodiments, the emitting module 1010 and the receiving module 1020 may be communicatively coupled to a control unit. The control unit may be configured to generate commands or control signals to the emitting module 1010 and/or the receiving module 1020, and receive output signals generated by the receiving module 1020. For example, the control unit may receive sensor output signals from the receiving module 1020 for further processing the data (e.g., final distance calculation or generating 3D image).

The control unit, functions, algorithms, operations, circuits or the methods may be implemented using software, hardware or firmware or a combination thereof. In some embodiments, the control unit may comprise one or more processors and at least one memory for storing program instructions. The processors may be a component of the Lidar system. Alternatively, the processors may be external to the Lidar system but in communication with the Lidar system. The processor(s) can be a single or multiple microprocessors, field programmable gate arrays (FPGAs), or digital signal processors (DSPs) capable of executing particular sets of instructions. Computer-readable instructions can be stored on a tangible non-transitory computer-readable medium, such as a flexible disk, a hard disk, a CD-ROM (compact disk-read only memory), and MO (magneto-optical), a DVD-ROM (digital versatile disk-read only memory), a DVD RAM (digital versatile disk-random access memory), or a semiconductor memory. The control unit may be a standalone device or system that is in communication with the Lidar system. Alternatively, the control unit may be a component of the Lidar system. The methods disclosed herein such as encoding and decoding the signal light and echo signals can be implemented in hardware components or combinations of hardware and software such as, for example, ASICs, special purpose computers, or general purpose computers.

In some cases, the control unit may implement or comprise multiple functional components such as an encoding module and a signal analysis module. In some cases, the encoding module may be configured to dynamically generate a coding scheme for encoding the signal light emitted from the emitting module. The signal analysis module may be configured to process sensor signals received from the receiving module.

Figure 1C:
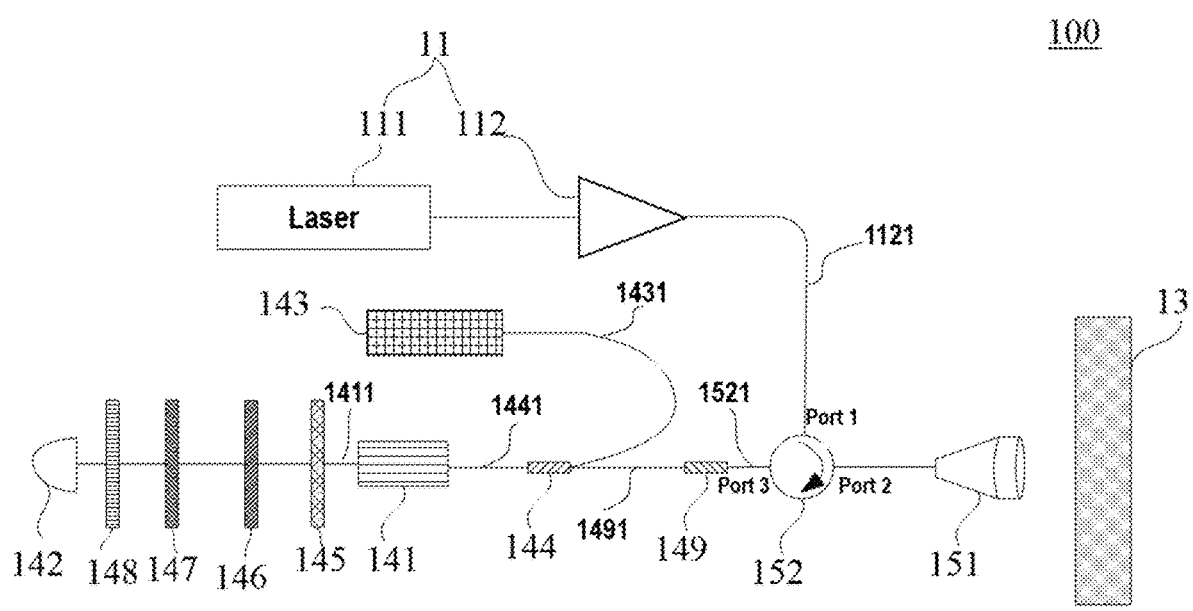
FIG. 1C shows an example of a Lidar system with an improved receiving unit, in accordance with some embodiments of the present application.

FIG. 1C shows an example of a Lidar system 100 with an improved receiving unit, in accordance with some embodiments of the invention. The receiving unit includes a plurality of components 141-149 and may comprise a wavelength conversion feature capable of converting the return light signals into a predetermined wavelength suitable to be detected by the detector 142.

The emitting unit 11 can be the same as the emitting module as described in FIG. 1B. In the illustrated example, the emitting unit may include a light source 11 such as a fiber-laser module having a laser diode 111 and an amplifier 112.

The light source 11 may produce optical pulses or signal light 1121. The signal light may be emitted at a free-space output or a fiber-optic output.

The laser diode 111 may have any suitable operating wavelength, such as for example, an operating wavelength of approximately 1400 nm, 1500 nm, 1550 nm, 1600 nm, or 2000 nm. The laser diode may be a Fabry-Perot laser diode, a distributed feedback (DFB) laser, or a distributed Bragg reflector (DBR) laser. In an example, the laser diode may be a DFB laser coupled to an optical fiber or a DFB laser configured to emit a free-space output beam. In some cases, the light source 11 may include a single laser diode having a substantially fixed operating wavelength. For instance, the laser diode may be a single-wavelength laser configured to operate at a particular operating wavelength with limited wavelength tunability. In another example, the laser diode may include a DFB laser with an operating wavelength between approximately 1400 nm and 1600 nm.

The light source 11 may comprise one or more optical amplifiers 112 (e.g., multi-stage erbium-doped fiber amplifier (EDFA)). The optical fiber 112 may be configured to amplify the low-power pulses to produce amplified pulses of light 1121. The amplified pulses of light 1121 may be emitted as output beams or signal light into an environment. An amplifier may be a fiber amplifier, gain fiber, optical amplifier, fiber-optic amplifier or other suitable type of optical amplifiers. An amplifier may include any suitable number of optical-amplification stages. As an example, an amplifier of a Lidar system may include one, two, three, four, or five optical-amplification stages. In some embodiments, an amplifier may include a single-pass amplifier in which light makes one pass through the amplifier. In some embodiments, an amplifier may include a double-pass amplifier in which light makes two passes through the amplifier gain medium. In some embodiments, amplifier may act as a preamplifier (e.g., an amplifier that amplifies laser pulses from the laser 111), a mid-stage amplifier (e.g., an amplifier that amplifies light from another amplifier), or a booster amplifier (e.g., an amplifier that sends a free-space output beam to a scanner). A preamplifier may refer to the first amplifier in a series of two or more amplifiers, a booster amplifier may refer to the last amplifier in a series of amplifiers, or a mid-stage amplifier may refer to any amplifier located between a preamplifier and a booster amplifier.

The amplifier 112 may provide any suitable amount of optical power gain, such as for example, a gain of approximately 5 dB, 10 dB, 20 dB, 30 dB, 40 dB, 50 dB, 60 dB, or 70 dB. As an example, a gain fiber amplifier (which may include two or more separate amplification stages) may receive pulses with a 1-µW average power and produce amplified pulses with a 5-W average power, corresponding to an optical power gain of approximately 67 dB. As another example, a gain fiber may include two or more amplification stages each having a gain of greater than or equal to 20 dB, corresponding to an overall gain of greater than or equal to 40 dB. As another example, the gain fiber may include three amplification stages (e.g., a preamplifier, a mid-stage amplifier, and a booster amplifier) having gains of approximately 30 dB, 20 dB, and 10 dB, respectively, corresponding to an overall gain of approximately 60 dB.

The light source 11 may comprise an optical fiber, which may convey, carry, transport, or transmit light from one optical component to another. The optical fiber may be referred to as a fiber-optic cable, fiber, optical link, fiber-optic link, or fiber link. An optical fiber may include single-mode (SM) fiber, large-mode-area (LMA) fiber, multi-mode (MM) fiber, polarization-maintaining (PM) fiber, photonic-crystal or photonic-bandgap fiber, gain fiber (e.g., rare-earth-doped optical fiber for use in an optical amplifier), multi-clad fiber (e.g., a double-clad fiber having a core, inner cladding, and outer cladding), or any other suitable optical fiber, or any suitable combination thereof. As an example, an optical fiber may include a glass SM fiber with a core diameter of approximately 8 µm and a cladding diameter of approximately 125 µm. As another example, an optical fiber may include a photonic-crystal fiber or a photonic-bandgap fiber in which light is confined or guided by an arrangement of holes distributed along the length of a glass fiber. In some embodiments, one end of an optical fiber may be coupled to, attached to, or terminated at an output collimator. An output collimator may include a lens, a GRIN lens, or a fiber-optic collimator that receives light from a fiber-optic cable and produces light beam.

Output signal pulses 1121 produced by the light source 11 may be delivered via optic fibers to a circulator 152, and provided to a collimator 151 then scanned across a field of view of the Lidar system by a scanner 13 of the lidar system 100. The signal light emitted from the Lidar system 100 into the field of view can be the same as the signal pulses 1121 produced by the light source. Although the emitting module and receiving module as described herein are shown in the figures in the context of a scanner-based Lidar system, the methods and apparatus as described herein can be applied to various types of Lidar systems that is not limited to using a scanner and that may or may not comprise movable components.

In the illustrated example, one or more circulators 152 may be disposed at the output end of the light source 11. A circulator 152 can be a non-reciprocal three- or four-port device (e.g., a waveguide circulator), in which a laser signal entering any port is transmitted to the next port in rotation. A port of the circulator is a point where an external channel or waveguide connects to the circulator. A circulator may be used to build a coaxial transceiver. For example, as shown in FIG. 1C, circulator 152 may receive an input laser signal generated by the light source at port 1, rotate the laser signal to the next port (e.g., port 2) and transmit the laser signal (to a scanner 13 via a collimator 151) to detect an object. After the signal light encounters the object, a return signal may be collected via free space optics (e.g., scanner 13, collimator 151) and received at port 2 (or another port) of the circulator 152, which then rotate the return signal to the next port (e.g., port 3) to provide a signal to a detector (through a train of optical components) for further processing.

In the illustrated example, the return signal 1521 collected by the Lidar system may comprise at least a portion of the echo beams of the signal light (e.g., at 1550 nm) and unwanted signals such as background noise. The collected return signal 1521 may, for example, travel through optic fiber connecting to port 3 of the circulator, pass through a filter 149 to remove at least a portion of the background noise. The filter 149 may be a bandpass filter so that echo beams 1491 at the initial wavelength (e.g., 1550 nm) may pass through and transmitted to the wavelength converter. For instance, the light signal 1491 passing through the filter 149 may be provided to a wavelength-division multiplexor (WDM) 144 to be joined with pump light 1431.

In some embodiment, the wavelength converter may comprise a non-linear wavelength conversion feature such as a periodical poled lithium niobate (PPLN) crystal 141 and a pump laser 143. In some cases, a mixed light signal 1441 of the pump laser and the input light signal 1491 is provided to the wavelength conversion features such as PPLN crystal 141 to convert the wavelength of the echo signal to a different wavelength, such as a shorter wavelength.

The pump laser 143 may provide pump light 1431 and the input light signal 1491 are injected into the input end of the WDM 144 to form a mixed light signal 1441. The two light components, one at the wavelength same as the light signal 1491 and the other at the wavelength same as the pump light 1431, are mixed in a PPLN crystal as input to generate an output photon at a third wavelength for non-linear frequency conversion. A PPLN crystal can be used to perform non-linear wavelength conversion, such as different frequency generation, sum frequency generation, four wave mixing, optical parametric oscillation, and/or other non-linear processes. The wavelength conversion feature may be based on a periodically poled crystal material such as periodically poled lithium niobate (PPLN) or other crystal material (e.g., titanyl phosphate, or KTP) which undergoes a periodic-poling process that produces a spatially periodic reversal of the orientation of the ferroelectric domains in the crystal. Other suitable periodically poled crystal material, such as, periodically poled potassium titanyl phosphate (PPKTP), periodically poled potassium titanyl arsenate (PPKTA), periodically poled rubidium titanyl arsenate (PPRTA), periodically poled lithium tantalate (PPLT), or periodically poled stoichiometric lithium tantalate (PPSLT) may also be used for tuning the wavelength of the return signal.

PPLN is a nonlinear material, and the highest conversion efficiency from input photons to generated output photons may occur when the intensity of photons in the crystal is the greatest. This can be accomplished by coupling the focused mixed light signal 1441 into the center of the PPLN crystal through the end face of the crystal at normal incidence. For a particular laser beam and crystal, there is an optimum spot size to achieve optimum conversion efficiency. If the spot size is too small, the intensity at the waist is high, but the Rayleigh range is much shorter than the crystal. Therefore, the size of the beam at the input face of the crystal is large, resulting in a lower average intensity over the whole crystal length, which reduces the conversion efficiency. For a laser beam with a Gaussian beam profile, the spot size should be chosen such that the Rayleigh range is half the length of the crystal. The spot size can then be reduced in small increments until the maximum efficiency is obtained. The mixed light signal 1441 may be collimated and focused by the WDM into an optimal beam spot onto the PPLN crystal 141 surface to achieve the optimal conversion efficiency.

The pump light 1431 may have a wavelength (e.g., 1310 nm or 1950 nm) different from that of the input light signal 1491. In some cases, the pump light 1431 may have wavelength selected to match the phase matching condition of the PPLN crystal and the wavelength of the echo signal (e.g., 1550 nm). For example, the wavelength of pump light may be selected to satisfy $1/\lambda_3=1/\lambda_1+1/h$, where the $\lambda_3$ is the desired output wavelength, $\lambda_1$ is the wavelength of the pump light and $\lambda_2$ is the input photo to be converted (e.g., echo signal at 1550 nm). Moreover, the two input photons are required to be phase matched in order to efficiently generate the combined photon. It is also necessary for the phase relation between the input and generated photons to be constant throughout the crystal.

PPLN is a quasi-phase-matched material that has high conversion efficiency. The orientation of the Lithium Niobate crystal is periodically inverted (poled). The inverted portions of the crystal yield generated photons that are 180° out of phase with the generated photon that would have been created at that point in the crystal if it had not been poled. By choosing the correct periodicity with which to flip the orientation of the crystal, the newly generated photons will always (at least partially) interfere constructively with previously generated photons, and as a result, the number of generated photons will grow as the light propagates through the PPLN, yielding a high conversion efficiency of input to generated photons.

The period with which the crystal needs to be inverted (the poling period) depends on the wavelengths of the light (input and generated) and the temperature of the PPLN. In some embodiments, changing the temperature of the PPLN crystal can vary phase matching conditions of input photons, which alters the periodicity of the poling in the PPLN crystal. The temperature may alter the wavelength of the output signal based on the following relationship:

$$n1f1 + n2f2 + \frac{2\pi}{\Lambda} = n3f3,$$

where $\Lambda$ represents periodicity which is a function of temperature, n1, n2, and n3 represent the reflection index of the two input photons and the output photon, $f_1$, $f_2$, $f_3$ represent the frequencies of the two input photons and the output photon. For instance, for a PPLN crystal that has a poling period of 6.6 μm at room temperature, it may efficiently generate frequency doubled photons from 1060 nm photons when the crystal temperature is held at 100° C. By increasing the temperature of the crystal to 200° C., PPLN will efficiently generate frequency doubled photons from 1068.6 nm photons. Changing the temperature of the crystal varies the phase matching conditions, which alters the periodicity of the poling in the crystal and thereby allows some tuning of the generated photon frequency. For example, by changing the temperature of the PPLN to a specific temperature, the wavelength converter can generate laser signals having a desired wavelength (e.g., 710 nm, 720 nm, 730 nm) based on the input laser signals having about 1550 nm wavelength and the pump light having about 1310 nm wavelength.

As an example, the input light (i.e., echo signal), pump light and the corresponding (modified) output signal may have wavelengths at about 1550 nm, 1310 nm and 710 nm respectively. In another example, the input light (i.e., echo signal), pump light and the corresponding (modified) output signal may have wavelengths at about (1570 nm, 1330 nm, 720 nm) or (1530 nm, 1290 nm, 700 nm). As mentioned above, the temperature of the PPLN may also affect the output wavelength. By tuning the temperature of the PPLN, an example of the input light (i.e., echo signal), pump light and the corresponding (modified) output signal may have wavelengths at about 1570 nm, 1310 nm and 710 nm respectively.

In some embodiments, the pump laser 143 may be controlled to generate pump light 1431 with a desired wavelength as described above such that the modified echo signal in the output light signal 1411 of the wavelength conversion feature may have an optimal wavelength. The optimal wavelength may be at or close to a wavelength that the SiPM detector has a high responsivity. In some cases, the echo beam signal may be modified in at least frequency/wavelength such that the modified echo beam signal in the output light signal 1411 can be easily distinguished from the background noise (e.g., high SNR) in frequency domain and/or temporal domain. For example, the modified frequency/wavelength of the echo signal and the frequency of the background noise may be spaced far enough apart that they may not overlap in frequency or the amplitude of the echo signal in the output light signal 1411 may be enhanced such that the SNR of the detector is improved.

The pump laser 143 may be capable of operating at suitable operating wavelength, such as for example, an operating wavelength of approximately 1310 nm, 1400 nm, 1500 nm, 1550 nm, 1600 nm, 1950 nm, or 2000 nm. The pump laser can be any suitable type such as Fabry-Perot laser diode, a distributed feedback (DFB) laser, a distributed Bragg reflector (DBR) laser, tunable Tm-doped fiber laser, erbium-doped optical fiber laser and the like and can be controlled to generate pump light with a desired wavelength or energy as described above.

As described elsewhere herein, the wavelength of the modified laser signals may be tuned into an optimal wavelength based on the characteristics of the SiPM detector responsivity. For instance, the wavelength of the modified laser signal (e.g., 700 nm-750 nm wavelength laser signals) may be within the detection range (e.g., about 600 nm-1000 nm) of a SiPM detector 142. In some examples, frequency modification using PPLN crystal can have a conversion efficiency (e.g., 80-90% at about 500 W peak power level).

Although the wavelength conversion feature as described herein are shown in the figures in the context of a PPLN crystal, the wavelength conversion is not limited to using PPLN. Other suitable wavelength conversion or frequency modification techniques may be adopted. For example, other second-order nonlinear optics materials such as bulk non-linear crystal, non-linear fiber, non-linear waveguide, and carbon nanotubes, graphene, and other 2D materials may be utilized for wavelength conversion.

The output light signal 1411 of the wavelength conversion feature may comprise the echo signal with the modified wavelength (e.g., 710 nm), background noise signal, residual pump light, residual light at the Stokes wavelength and others. In some cases, following the wavelength conversion feature 141 may include one or more filters 146, 147 that is used to remove the unwanted light (e.g., residual pump light, residual light at the Stokes wavelength and noise). For example, filters 146, 147 may be optical band-pass filters that have narrow bandwidths of 1 nm-5 nm and a center wavelength at about 710 nm to remove the unwanted light signal.

The light signal 1411 may also pass through a plurality of optics such as one or more lens 145, 148 to be focused onto an active region of the detector 142. As described above, the detector 142 may be a SiPM detector and the light signal received by the SiPM may have a wavelength (e.g., 750 nm) within the detection range of (e.g., about 600-1000 nm) of a SiPM detector with the unwanted signals removed. This may reduce the saturation or overload of the SiPM detector caused by the background noise signals.

The SiPM detector 142 may convert the light signal into an electrical signal. The output electrical signal generated by the detector may be transmitted to a processing circuit of the SiPM detector or the receiving unit to generate a pixel value (e.g., amplitude) or a measurement. The SiPM detector can be the same as those described in FIG. 1A and FIG. 1B. For example, the SiPM detector may comprise a plurality of microcells which are independently operating units of SPAD and quench resistor. When a microcell in the SiPM fires in response to an absorbed photon, a Geiger avalanche is initiated causing a photocurrent to flow through the microcell. This results in a voltage drop across the quench resistor, which in turn reduces the bias across the diode to a value below the breakdown, thus quenching the photocurrent and preventing further Geiger-mode avalanches from occurring.

Figure 2:
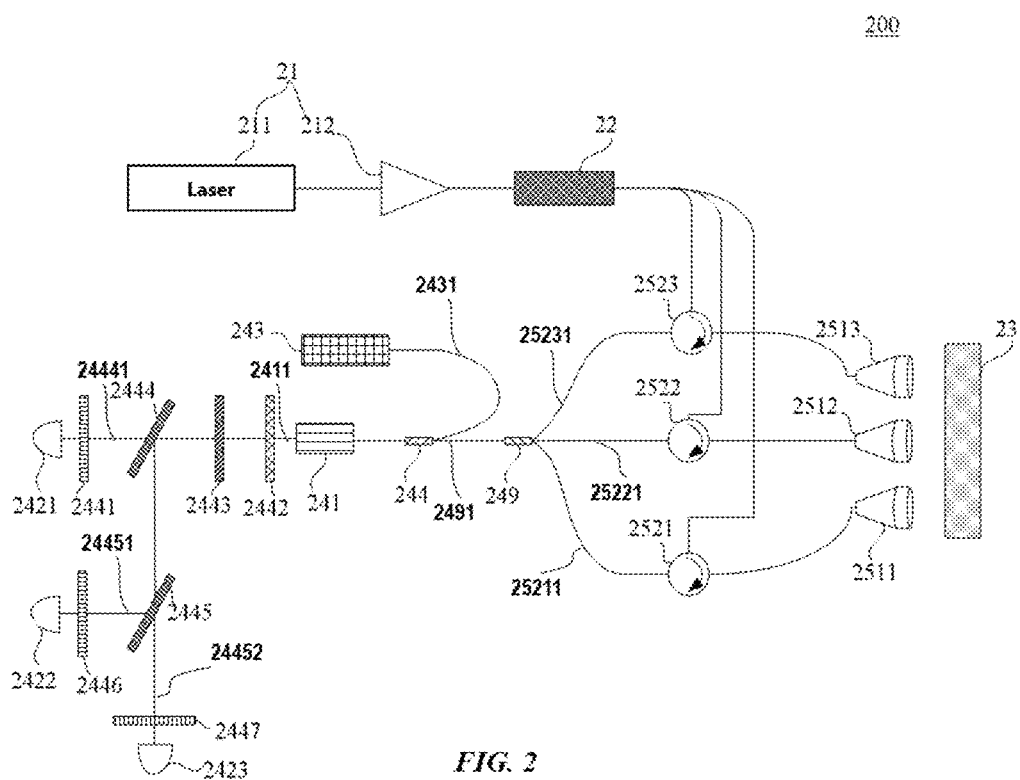
FIG. 2 shows an example of a Lidar system using multi-wavelength as signal light, in accordance with some embodiments of the present application.

In some embodiments, the Lidar system may utilize multi-wavelength light signal or light pulses of multiple wavelengths. The signal light pulses having the multiple wavelengths may be used for multiple channels. FIG. 2 illustrate another example of the Lidar system 200, in accordance with some embodiments of the invention. The multiple wavelengths of the signal light may be above 1000 nm (e.g., 1549.32 nm, 1550.12 nm, 1550.92 nm) to provide additional advantage such as reducing cross-talk among different channels or different Lidar systems. In some cases, at least two channels or adjacent channels of the Lidar system may use different wavelengths and the different wavelengths may be spaced far enough apart that they may not overlap in frequency.

The light source 21 can be substantially the same as the light source as described in FIG. 1C. For example, the light source 21 may comprise a laser 211 producing light pulses comprising multiple wavelengths and amplified by an amplifier 212 (e.g., EDFA). The multi-wavelength light signal may be a mixed signal which is provided to a wavelength division multiplexing (WDM) element 22 to split the multiple wavelengths signals.

The wavelength division multiplexing element 22 can be any type (e.g., normal (WDM), coarse (CWDM) and dense (DWDM)) based on the spacing of the wavelengths, number of channels, and the ability to amplify the multiplexed signals in the optical space. For instance, the wavelength division multiplexing element 22 may be a dense wavelength division multiplexing (DWDM) which is selected for optical signals multiplexed within the 1550 nm band so as to leverage the capabilities (and cost) of erbium doped fiber amplifiers (EDFAs), which are effective for wavelengths between approximately 1525-1565 nm (C band), or 1570-1610 nm (L band). For example, when the multiple lasers have wavelengths 1290, 1310, 1330 nm (i.e., sparse spacing), CWDM may be utilized, whereas when the multiple lasers have wavelengths 1549.32 nm, 1550.12 nm, 1550.92 nm (i.e., dense spacing).

The multi-wavelength light signals (e.g., 1549.32 nm, 1550.12 nm, 1550.92 nm) may be provide to a plurality of channels. In some cases, each channel may correspond to a different wavelength for measuring distance. The plurality of channels may include a plurality of circulators 2523, 2522, 2521, collimators 2513, 2512, 2511 and a plurality of detectors 2421, 2422, 2423 each detecting echo signals at a different wavelength. This may beneficially expand the sensing channels while using a shared light source. The circulator and the collimator can be the same as those described in FIG. 1C. For example, each circulator 2523, 2522, 2521 may transmit the corresponding signal light to a scanner 23 via the respective collimator 2513, 2512, 2511 such that the signal light corresponding to different channels may be steered to different points in the 3D environment by the scanner 23.

Similarly, after the signal light encounters the object, a return signal may be collected via free space optics (e.g., collimator 2513, 2512, 2511) in a reciprocal manner, and received at the respective circulator which then rotates the return signal to the next port to provide a signal to the corresponding detector 2421, 2422, 2423 (through a train of optical components). In the illustrated example configuration, each channel may correspond to a circulator, a collimator and a SiPM detector while the multiple channels may share a pump laser 243 and wavelength conversion feature 241.

The return signals 25231, 25221, 25211 from the multiple channels may be provided to a DWDM 249 of the receiving unit to split the echo beams with the different wavelengths apart. The light signals 2491 may be provided to a WDM 244 to be joined with a multi-wavelength pump light 2431.

The pump laser 243 may be configured to generate multi-wavelength pump light 2431 (e.g., 1290 nm, 1310 nm, 1330 nm) corresponding to the multiple-wavelength of the input light (e.g., 1530 nm, 1550 nm, 1570 nm) and the desired output wavelength (e.g., 700 nm, 710 nm, 720 nm). The multiple wavelengths of the pump light can be determined based on the PPLN characteristics and the non-linear wavelength conversion principle as described above. The multi-wavelength pump light may be selected to match the phase matching condition of the PPLN crystal and the input photons (i.e., echo signal in the input signal 2491). In some embodiments, the multiple wavelength or energy of the pump light may be selected such that the modified frequencies/wavelengths of the output signal may be easily distinguished from the background noise thereby improving the SNR of the detector.

The initial multiple wavelengths (e.g., 1530 nm, 1550 nm, 1570 nm) of the light signal 2491 may then be modified into corresponding multiple shorter wavelengths (e.g., 700 nm, 710 nm, 720 nm) by the wavelength conversion feature 241 (e.g., PPLN). The output light signal 2411 of the wavelength conversion feature may comprise echo signals having multiple modified wavelengths (e.g., 700 nm, 710 nm, 720 nm) all of which are within the operating wavelength band of the SiPM detectors 2421, 2422, 2423 as well as unwanted signals (e.g., residual light at the Stokes wavelength and background noise). The multiple wavelengths of the output light signal 2411 may be easily distinguished from the background noise (e.g., high SNR) in the frequency domain and/or temporal domain. For example, the modified multiple frequencies of the output signal and the frequency of the background noise may be spaced far enough apart that they may not overlap in frequency such that the SNR of the detector is improved.

The output light signal 2411 of the wavelength conversion feature may then pass through a filter 2443 to remove the unwanted signals (e.g., residual light at the Stokes wavelength and background noise). The light signals with the unwanted signals removed may then pass through a plurality of bandpass filters such that the modified echo signals having the multiple modified wavelengths (e.g., 700 nm, 710 nm, 720 nm) are split apart and received by different detectors for the multiple channels.

In some cases, the modified wavelengths for the different channels may be spaced far enough apart that they may not overlap in frequency. For example, when the signal light has three different wavelengths, a first portion of the modified return signal 24441 at a first modified wavelength (e.g., corresponding to initial wavelength 1549.32 nm) may be received by a first SiPM detector 2421, a second portion of the modified return signal 24451 at a second modified wavelength (e.g., corresponding to initial wavelength 1550.12 nm) and a third portion of the modified return signal 24452 at a third modified wavelength (e.g., corresponding to initial wavelength 1550.92 nm) may be filtered and passed to the corresponding SiPM detectors 2422 and 2423 via filters 2445 and 2447. Similarly, one or more optical components such as lens 2442, 2441, 2446 and 2447 are included to focus the corresponding light beams to the corresponding SiPM detector. The plurality of filters 2444, 2445, 2447 may be bandpass filters that have narrow bandwidths of 1 nm-5 nm or ultra-narrow bandwidth of 0.1 nm-1 nm such that the different wavelengths can be separated for the multiple channels.

Figure 3A:
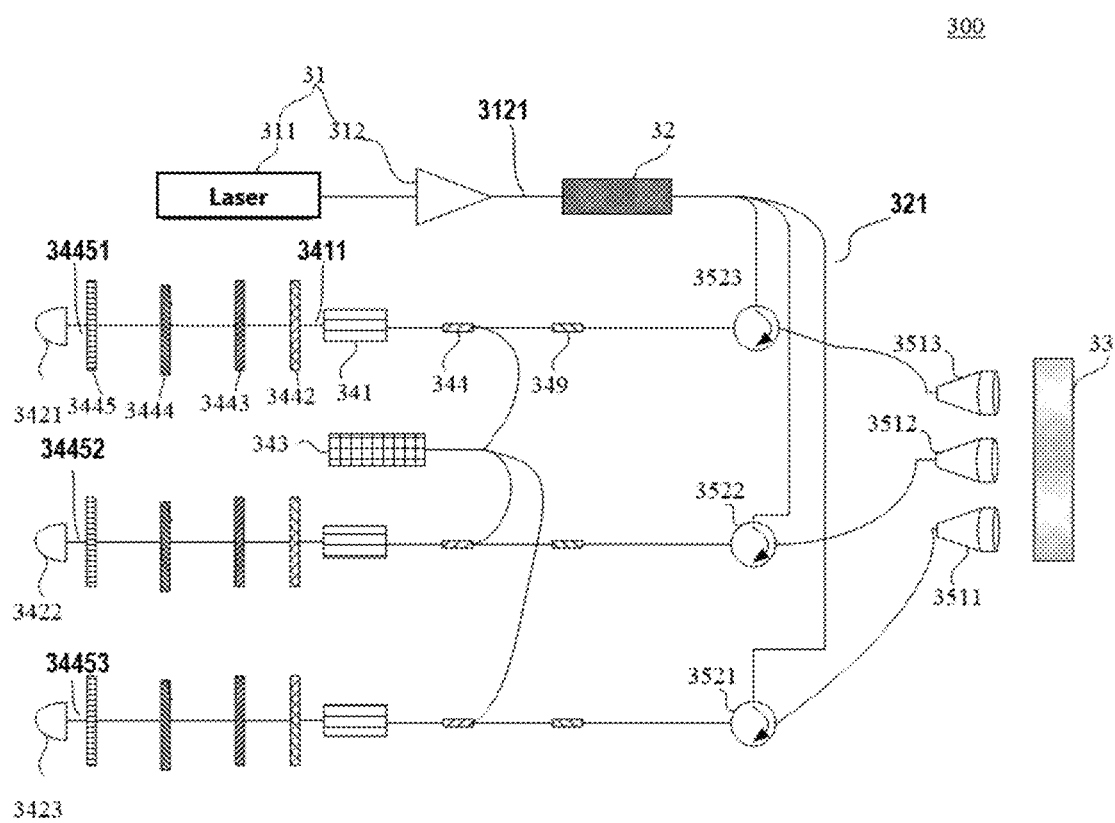
FIG. 3A and FIG. 3B show examples Lidar system with improved receiving unit, in accordance with some embodiments of the present application.
Figure 3B:
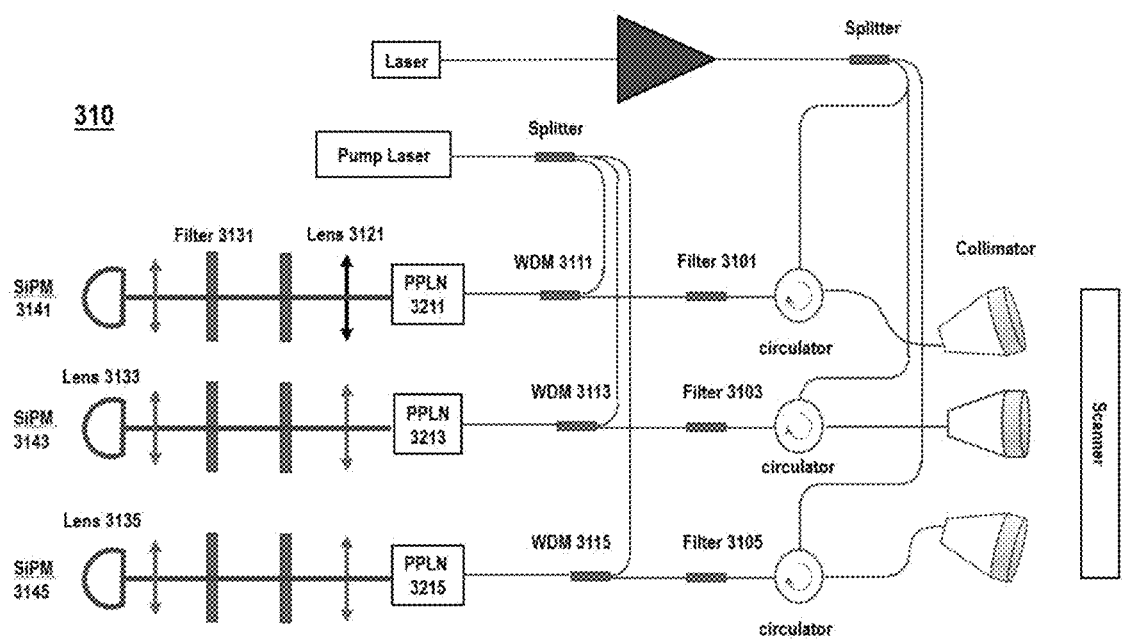

FIG. 3A and FIG. 3B show another example of Lidar system 300, in accordance with the embodiments. The Lidar system 300 may comprise at least one light source generating light pulses used for multiple channels. The Lidar system 300 may be similar to the Lidar system 200 except that the laser beam 3121 generated by the light source is single-wavelength light signal which is split into multiple light beams for multiple channels. Each channel of the Lidar system may be understood to be formed by a circulator, a collimator, a wavelength conversion feature and a SiPM detector while the multiple channels may share a pump laser 343.

The light beam 3121 generated by the light source may be single-wavelength light signal which is split into multiple light beams to be detected by the multiple channels. The emitting module of the Lidar system 300 may be similar to the emitting module of the Lidar system 200 except that the light source 31 (e.g., laser 311, amplifier 312) is configured to generate single-wavelength light beam 3121 which is then split into multiple light beams by a splitter 32 instead of DWDM. The emitting module may comprise a plurality of circulators 35423, 3522, 3521, and collimators 3513, 3512, 3511 corresponding to the multiple channels, and a scanner 33 arranged in a configuration similar to the configuration as described in FIG. 2.

The light beam 3121 may be split by a splitter 32 into two or more light beams 321 having the same wavelength. The splitter 32 can be any suitable type such as a demultiplexer which may include a 1×N fiber-optic power splitter with one fiber-optic input port coupled to the output of the light source 31 and N fiber-optic output ports. As an example, an optical-power splitter may include one or more fused biconical taper (FBT) splitters which are assembled by placing two or more fibers adjacent to one another and then fusing the fibers together by applying heat. As another example, an optical-power splitter may include a planar lightwave circuit made by fabricating optical waveguides on a glass substrate using a lithographic process.

The multiple light beams 321 can be used by multiple channels corresponding to multiple SiPM detectors 3421, 3422, 3423. Each of the multiple channels at the receiving module may correspond to an individual wavelength conversion feature 341 while the multiple channels share a single pump laser 343.

At the receiving module, each channel may comprise a SiPM detector 3421 and the corresponding components such as lens 3442, 3445, and filters 3443, 3433 arranged in a configuration similar to the configuration as described in FIG. 1C. In the illustrated example, the return signal may be received by the corresponding channel such as collimator 3513, circulator 3523 in a reciprocal manner and the return signal in each channel passes through a corresponding filter 349 to filter out the background noise. The light signal may be individually combined with a portion of the pump light generated by the pump laser 343 at a corresponding WDM 344.

The pump laser 343 may generate pump light which is split into portions and each portion is individually combined with the light signal for each channel. The pump light may be single-wavelength corresponding to the initial wavelength of the collected return signal and the property of the corresponding PPLN 341. A portion of the pump light and the corresponding return signal are combined at the individual WDM 344 then modified by the corresponding wavelength conversion feature 341. Each channel may comprise a SiPM detector 3421, 3422, 3423 and the corresponding lens 3442, 3445, and filters 3443, 3433 arranged in a configuration similar to those described in FIG. 1C.

The initial wavelength of the echo signals received from the multiple channels may be the same. The modified wavelength corresponding to the multiple channels may or may not be the same. In some cases, the wavelength conversion features 341 for the different channels may be controlled to have the same condition (e.g., temperature, same type of non-linear optics for wavelength conversion) such that the modified wavelength of the echo signal in the output light signal 3411 may be the same for the multiple channels. In such cases, the echo signals 34451, 34452, 34453 received by the multiple SiPM 3421, 3422, 3423 may have substantially the same wavelength.

Alternatively, the wavelength conversion feature for the multiple channels may not be the same. FIG. 3B shows another example Lidar system 310, in accordance with some embodiments. The Lidar system 310 may be similar to the Lidar system 300 described above, except that at the receiving module, the wavelength conversion feature 3211, 3212, 3213 for the multiple channels are different such that the modified echo signals received by the SiPM detectors 3141, 3143, 3145 may have different wavelengths. For example, by tuning the temperature of the PPLNs 3211, 3212, 3213, even though the pump light (e.g., 1310 nm) or echo signals (e.g., 1550 nm) injected into the three PPLNs have the same wavelengths, the output modified light signals may have different wavelengths (e.g., 700 nm, 705 nm, 710 nm). In the illustrated example 310, collected return signal at the same initial frequency (e.g., 1550 nm) may be received by the corresponding channel and individually passed through filters 3101, 3103, 3105 to remove background noise. The multiple channels may correspond to multiple WDMs 3111, 3113, 3115 each is configured to join at least a portion of the pump light generated by the pump laser with the return signal.

Similar to FIG. 3A, the pump light may be split into portions by a splitter. A portion of the pump light and the corresponding return signals are combined at the individual WDM then modified by the corresponding wavelength conversion features (e.g., PPLN 3211, 3213, 3215).

In some cases, the output light of the plurality of wavelength conversion features (e.g., PPLN 3211, 3213, 3215) may have different modified wavelengths (e.g., 700 nm, 705 nm, 710 nm). This can be controlled by adjusting conditions of the PPLNs such as the operation temperature as described above. The different modified wavelength may be within the operating wavelength band of the SiPM detectors 3141, 3143 3134 and the unwanted signals (e.g., residual light at the Stokes wavelength and background noise) are removed by the corresponding filters 3131 and received by the detectors through lens 3121 in a configuration similar to those described in FIG. 1C. In such cases, the filters 3131 for the multiple channels may have different bands such that the echo signals with the differently modified wavelengths can pass through and be received by the corresponding SiPM detectors.

Figure 4:
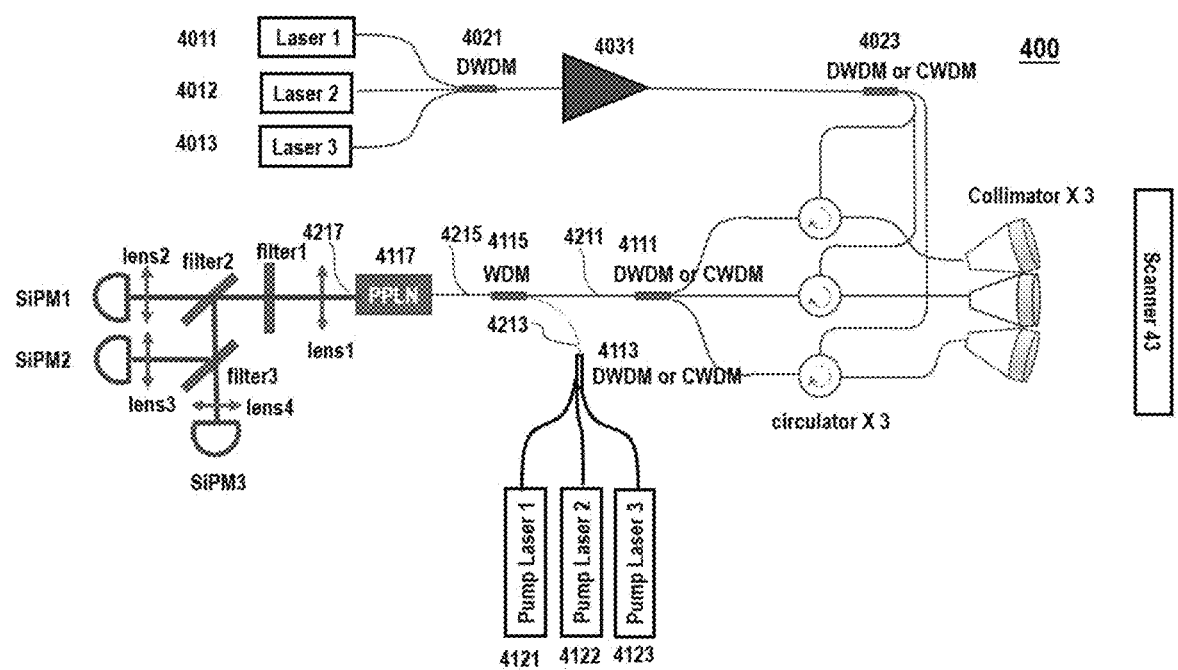
FIG. 4 shows an example of a Lidar system, in accordance with some embodiments of the present application.

FIG. 4 shows another example Lidar system 400, in accordance with some embodiments. The Lidar system 400 may be similar to the Lidar system 200 described in FIG. 2 except that multiple lasers 4011, 4012, 4013 are utilized to provide multiple wavelengths of signal light and multiple pump lasers 4121, 4122, 4123 are utilized to provide the corresponding pump light to the multiple channels.

The emitting module of the Lidar system 400 may comprise multiple lasers 4011, 4012, 4013 configured to generate laser pulses at different wavelengths (e.g., 1530 nm, 1550 nm, 1570 nm). The generated laser pulses may be joined by a DWDM 4021 prior to being amplified by the amplifier (e.g., EDFA 4031). The output of the emitting module may then be split apart by the CWDM 4023 and provided to multiple circulators and collimators to expand number of channels. For example, each circulator may transmit the corresponding signal light to a scanner via the respective collimator such that the signal light corresponding to different channels may be steered to different locations in the 3D environment by the scanner 43. As described above, when the multiple lasers wavelengths have sparse spacing 1290, 1310, 1330 nm or 1530 nm, 1550 nm, 1570 nm, CWDM may be utilized, whereas when the multiple lasers wavelengths have dense spacing such as 1549.32 nm, 1550.12 nm, 1550.92 nm, DWDM may be utilized.

After the signal light encounters the object, a return signal may be collected via free space optics (e.g., collimator) in a reciprocal manner, and received at the respective circulator which then rotates the return signal to the next port to provide a signal to a corresponding detector (through a train of optical components). In the illustrated example, each channel the receiving module may correspond to a circulator, a collimator, a pump laser and a SiPM detector, while the multiple channels may share a wavelength conversion feature 4117.

The return signal collected from the multiple channels may comprise echo signals at the multiple frequencies. The return signal collected from the multiple channels may be then joined by the DWDM or CWDM 4111 to form a mixed signal 4111, and further combined with pump light 4213 produced by the multiple pump lasers 4121, 4122, 4123. The multiple pump lasers 4121, 4122, 4123 may generate pump light of different wavelengths (e.g., 1290 nm, 1310 nm, 1330 nm) corresponding to the multiple wavelengths of the echo signal. The pump light generated by the multiple pump lasers 4121, 4122, 4123 may be joined by DWDM or CWDM 4113 to form a mixed pump light 4213 as input pump light to the WDM 4115. The pump light with the multiple wavelengths may be selected to match the phase matching condition of the PPLN crystal and the input photons (i.e., echo signals in the return signal 4211). In some embodiments, the wavelength or energy of the pump laser may be selected such that the modified frequencies/wavelengths of the output signal may be easily distinguished from the background noise thereby improving the SNR of the detector.

The output light signal 4215 of the WDM 4115 may then be provided to the PPLN 4117. The output light signal 4217 of the PPLN 4117 may comprise echo beams at multiple modified wavelengths and unwanted signals (e.g., residual light at the Stokes wavelength and background noise). The unwanted signals may be removed by a filter (e.g., filter 1) and the echo beams at the different frequencies may be split apart by optical components such as filter 2, filter 3 such that echo beams with different wavelengths are received by corresponding detectors in a configuration similar as those described in FIG. 1C.

As described above, emitting light pulses at different wavelengths may provide various benefits such as preventing cross-talking among channels or cross-talking between different Lidar systems. For example, adjacent channels may utilize different wavelengths thereby reducing cross-talk. In another example, by emitting light pulses at different wavelengths, a sequence of light pulses may be frequency modulated according to a pre-determined coding scheme to further reduce cross-talk between different Lidar systems.

The electrical signal (i.e., sensor output signal) generated by the plurality of SiPM detectors may be further processed by a signal analysis module. The signal analysis module may receive the sensor output signal from the SiPM detectors and generate an image. In some cases, the signal analysis module may be configured to correlate the return signals to the sequence of measurement signals and calculate a distance based on the delay time between the correlated signals. In some embodiments, a distance may be calculated using the time of flight associated the multi-pulse sequence. In some cases, the time of flight associated with the multi-pulse sequence may be determined using the average of time of flight associated with each pulse within a sequence. For example, when the signal light comprises multiple wavelengths, the signal analysis module may calculate a distance based on a time of flight associated with the returned light pulses for a given channel (e.g., at a given wavelength), and the time of flight may be determined by determining a match between the sequence of detected light pulses and the initial wavelength of the signal light and/or a temporal profile of the signal light.

The provided receiving unit, methods and Lidar system can be utilized in conjunction with various Lidar systems or can be used in various applications. A Lidar system equipped with the described receiving unit may be provided on a movable object to sense an environment surrounding the movable object. Alternatively, the Lidar system may be installed on a stationary object.

A movable object of the present invention can be configured to move within any suitable environment, such as in air (e.g., a fixed-wing aircraft, a rotary-wing aircraft, or an aircraft having neither fixed wings nor rotary wings), in water (e.g., a ship or a submarine), on ground (e.g., a motor vehicle, such as a car, truck, bus, van, motorcycle, bicycle; a movable structure or frame such as a stick, fishing pole; or a train), under the ground (e.g., a subway), in space (e.g., a spaceplane, a satellite, or a probe), or any combination of these environments. The movable object can be a vehicle, such as a vehicle described elsewhere herein. In some embodiments, the movable object can be carried by a living subject, or take off from a living subject, such as a human or an animal.

In some cases, the movable object can be an autonomous vehicle which may be referred to as an autonomous car, driverless car, self-driving car, robotic car, or unmanned vehicle. In some cases, an autonomous vehicle may refer to a vehicle configured to sense its environment and navigate or drive with little or no human input. As an example, an autonomous vehicle may be configured to drive to any suitable location and control or perform all safety-critical functions (e.g., driving, steering, braking, parking) for the entire trip, with the driver not expected to control the vehicle at any time. As another example, an autonomous vehicle may allow a driver to safely turn their attention away from driving tasks in particular environments (e.g., on freeways), or an autonomous vehicle may provide control of a vehicle in all but a few environments, requiring little or no input or attention from the driver.

In some instances, the Lidar systems may be integrated into a vehicle as part of an autonomous-vehicle driving system. For example, a Lidar system may provide information about the surrounding environment to a driving system of an autonomous vehicle. In an example, the Lidar system may provide a wide range of horizontal field of view and vertical field of view of the vehicle. An autonomous-vehicle driving system may include one or more computing systems that receive information from a Lidar system about the surrounding environment, analyze the received information, and provide control signals to the vehicle's driving systems (e.g., steering wheel, accelerator, brake, or turn signal).

As used herein A and/or B encompasses one or more of A or B, and combinations thereof such as A and B. It will be understood that although the terms "first," "second," "third" etc. are used herein to describe various elements, components, regions and/or sections, these elements, components, regions and/or sections should not be limited by these terms. These terms are merely used to distinguish one element, component, region or section from another element, component, region or section. Thus, a first element, component, region or section discussed herein could be termed a second element, component, region or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including," when used in this specification, specify the presence of stated features, regions, integers, steps, operations, elements and/or components, but do not preclude the presence or addition of one or more other features, regions, integers, steps, operations, elements, components and/or groups thereof.

Reference throughout this specification to "some embodiments," or "an embodiment," means that a particular feature, structure, or characteristic described in connection with the embodiment is included in at least one embodiment. Thus, the appearances of the phrase "in some embodiment," or "in an embodiment," in various places throughout this specification are not necessarily all referring to the same embodiment. Furthermore, the particular features, structures, or characteristics may be combined in any suitable manner in one or more embodiments.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. Numerous different combinations of embodiments described herein are possible, and such combinations are considered part of the present disclosure. In addition, all features discussed in connection with any one embodiment herein can be readily adapted for use in other embodiments herein. It is intended that the following claims define the scope of the invention and that methods and structures within the scope of these claims and their equivalents be covered thereby.

What is claimed is:

1. A light detection and ranging system comprising:
   an emitting unit comprising a light source configured to emit a sequence of light pulses of a first set of first wavelengths into a three-dimensional environment; and
   a receiving module comprising,
   (i) a plurality of detectors for detecting light pulses of a second set of second wavelengths, wherein the second set of second wavelengths is shorter than the first set of first wavelengths,
   (ii) a wavelength converter configured to convert an echo signal of the emitted light pulses of the first set of first wavelengths into the light pulses of the second set of second wavelengths, wherein an input end of the wavelength converter is configured to receive (a) a mixed signal of the echo signal of the first set of first wavelengths and (b) a pump light comprising multiple wavelengths corresponding to the first set of first wavelengths, and wherein an output end of the wavelength converter is coupled to the plurality of detectors via multiple trains of optical components, respectively, to separate the light pulses of the second set of second wavelengths; and (iii) one or more optical elements configured to: (a) combine the echo signal of the emitted light pulses of the first set of first wavelengths into the mixed signal, and (b) provide a combination of the mixed signal and the pump light to the input end of the wavelength converter.

2. The light detection and ranging system of claim 1, wherein the first set of first wavelengths is in a range between 1400 nm and 2050 nm.

3. The light detection and ranging system of claim 1, wherein the first set of first wavelengths is outside the wavelength range detectable by the detector.

4. The light detection and ranging system of claim 1, wherein the light source comprises an eye-safe laser and a fiber amplifier.

5. The light detection and ranging system of claim 1, wherein the emitting unit comprises a scanner to direct the sequence of light pulses to the three-dimensional environment to generate a point distribution pattern.

6. The light detection and ranging system of claim 1, wherein the plurality of detectors comprise a silicon photomultipliers (SiPM) sensor.

7. The light detection and ranging system of claim 1, wherein the second set of second wavelength is shorter than 1000 nm.

8. The light detection and ranging system of claim 1, wherein the second set of second wavelength is within a wavelength range detectable by the detector.

9. The light detection and ranging system of claim 1, wherein the receiving module comprises a first filter to remove unwanted light from the echo signal having the first set of first wavelengths and a second filter to remove unwanted light from the light pulses of the second set of second wavelengths.

10. The light detection and ranging system of claim 1, wherein the emitting unit comprises a splitter to split the sequence of light pulses for use in multiple channels.

11. The light detection and ranging system of claim 1, wherein the light pulses received by the plurality of detectors have the same second wavelength across the multiple channels.

12. The light detection and ranging system of claim 1, wherein the light pulses received by the plurality of detectors have different wavelengths across the multiple channels.

13. The light detection and ranging system of claim 1, wherein the sequence of light pulses of the first set of first wavelengths are used by multiple channels.

14. The light detection and ranging system of claim 13, further comprising one or more processors configured to calculate a distance based on a time of flight associated with the light pulses for the multiple channels.

15. The light detection and ranging system of claim 1, wherein the wavelength converter comprises periodical poled lithium niobate (PPLN) crystal and a pump laser.

16. The light detection and ranging system of claim 15, wherein the pump light produced by the pump laser and the echo signal of the emitted light pulses are received at the PPLN and converted into the light pulses of the second set of second wavelengths.

17. The light detection and ranging system of claim 16, wherein the second set of second wavelength is based on the wavelengths of the pump light and the first set of first wavelengths.

18. A method for a light detection and ranging system comprising:

emitting a sequence of light pulses of a first set of first wavelengths into a three-dimensional environment;

combining, by one or more optical elements, an echo signal of the emitted light pulses of the first set of first wavelengths into a mixed signal and providing a combination of the mixed signal and a pump light to an input end of a wavelength converter, wherein the pump light comprises multiple wavelengths corresponding to the first set of first wavelengths, converting, by the wavelength converter, the echo signal of the emitted light pulses into light pulses of a second set of second wavelengths, wherein the input end of the wavelength converter receives the combination of the mixed signal of the echo signal and the pump light, and wherein an output end of the wavelengths converter is coupled to a plurality of detectors via multiple trains of optical components, respectively, to separate the light pulses of the second set of second wavelengths; and receiving, at the plurality of detectors, the light pulses of the second set of second wavelengths, wherein the second set of second wavelengths is shorter than the first set of first wavelengths.

19. The method of claim 18, wherein the first set of first wavelengths is in a range between 1400 nm and 2050 nm or is outside the wavelength range detectable by the plurality of detectors.

20. The method of claim 18, wherein the sequence of light pulses generated by a light source comprising an eye-safe laser and a fiber amplifier.

21. The method of claim 18, wherein the sequence of light pulses are directed to the three-dimensional environment by a scanner to generate a point distribution pattern.

22. The method of claim 18, wherein the plurality of detectors comprise a silicon photomultipliers (SiPM) sensor.

23. The method of claim 18, wherein the second set of second wavelength is shorter than 1000 nm or is within a wavelength range detectable by the detector.

24. The method of claim 18, further comprising removing unwanted light from the echo signal having the first set of first wavelengths and removing unwanted light from the light pulses of the second set of second wavelengths using a second filter.

25. The method of claim 18, further comprising splitting the sequence of light pulses for use in multiple channels.

* * * * *